(12) United States Patent
Kato

(10) Patent No.: US 11,661,019 B2
(45) Date of Patent: May 30, 2023

(54) VEHICLE INCLUDING DRAINAGE ASSEMBLY

(71) Applicants: TOYOTA JIDOSHA KABUSHIKI KAISHA, Toyota (JP); SUBARU CORPORATION, Tokyo (JP)

(72) Inventor: Hajime Kato, Tokyo-to (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/369,009

(22) Filed: Jul. 7, 2021

(65) Prior Publication Data
US 2022/0063519 A1    Mar. 3, 2022

(30) Foreign Application Priority Data

Aug. 25, 2020 (JP) .............................. JP2020-141480

(51) Int. Cl.
*B60R 13/07* (2006.01)

(52) U.S. Cl.
CPC ................................. *B60R 13/07* (2013.01)

(58) Field of Classification Search
CPC .... B62D 25/081; B62D 25/105; B62D 25/10; B60R 13/07
USPC .................................... 296/192, 208, 193.11
See application file for complete search history.

(56) References Cited

U.S. PATENT DOCUMENTS

| | | | | |
|---|---|---|---|---|
| 4,591,202 A | * | 5/1986 | Burk | B62D 25/081 |
| | | | | 296/203.02 |
| 4,646,864 A | * | 3/1987 | Racchi | B62D 25/105 |
| | | | | 181/204 |
| 5,277,656 A | * | 1/1994 | Koukal | B60H 1/28 |
| | | | | 454/147 |
| 8,118,352 B2 | * | 2/2012 | Rocheblave | B60R 21/34 |
| | | | | 296/193.11 |
| 2003/0017798 A1 | * | 1/2003 | Hanaya | B60K 15/035 |
| | | | | 454/147 |
| 2006/0232106 A1 | * | 10/2006 | Haas | B62D 25/081 |
| | | | | 296/208 |
| 2008/0314672 A1 | | 12/2008 | Takimoto et al. | |
| 2010/0201157 A1 | * | 8/2010 | Daab | B62D 25/081 |
| | | | | 296/203.02 |
| 2014/0117722 A1 | * | 5/2014 | Lacroix | B62D 25/081 |
| | | | | 296/192 |

(Continued)

FOREIGN PATENT DOCUMENTS

DE   102017124570 A1 * 4/2019
JP   2003-034267 A     2/2003

(Continued)

OTHER PUBLICATIONS

Machine translation of DE-102017124570-A1.*

*Primary Examiner* — Dennis H Redder
*Assistant Examiner* — Kevin P Weldon
(74) *Attorney, Agent, or Firm* — Oliff PLC

(57) ABSTRACT

A vehicle may include: a body including a front compartment; a hood panel covering the front compartment and including a recess in an upper surface of the hood panel; a hood garnish mounted at the recess; a drainage outlet disposed at a bottom of the recess and penetrating the hood panel; and a drainage channel disposed below the hood panel and including an inlet configured to receive drainage water from the recess.

5 Claims, 6 Drawing Sheets

(56) References Cited

U.S. PATENT DOCUMENTS

| | | | | |
|---|---|---|---|---|
| 2016/0159211 A1* | 6/2016 | Nakagawa | ............ | B62D 25/105 |
| | | | | 180/65.31 |
| 2018/0251162 A1* | 9/2018 | Overgaard | .............. | B60R 13/00 |

FOREIGN PATENT DOCUMENTS

| JP | 2007-196787 A | 8/2007 |
|---|---|---|
| JP | 2016-068808 A | 5/2016 |

* cited by examiner

VEHICLE INCLUDING DRAINAGE ASSEMBLY

CROSS-REFERENCE TO RELATED APPLICATION

This application claims priority to Japanese Patent Application No. 2020-141480 filed on Aug. 25, 2020, the contents of which are hereby incorporated by reference into the present application.

TECHNICAL FIELD

The technique disclosed herein relates to a vehicle. In particular, the technique relates to a structure that enables drainage from a recess provided in an upper surface of a hood panel.

BACKGROUND

Japanese Patent Application Publication No. 2016-68808 describes a technique for disposing a hood garnish (also called a deflector) on an upper surface of a hood panel covering a front compartment of a vehicle. The hood garnish is a plate disposed on the upper surface of the hood panel and is configured to direct an air flow upward to make it flow smoothly toward a front windshield while the vehicle is traveling.

SUMMARY

In such a vehicle structure, a recess may be provided in the upper surface of the hood panel and the hood garnish may be disposed to cover the recess. In such a structure, water may accumulate in the recess of the hood panel.

A vehicle disclosed herein may comprise a body comprising a front compartment; a hood panel covering the front compartment and comprising a recess in an upper surface of the hood panel; a hood garnish mounted at the recess; a drainage outlet disposed at a bottom of the recess and penetrating the hood panel; and a drainage channel disposed below the hood panel and comprising an inlet configured to receive drainage water from the recess.

In the vehicle disclosed herein, water can be drained from the recess in the upper surface of the hood panel. Thus, it is possible to prevent problems such as formation of rust.

Details and further improvements of the technique disclosed herein will be described in DETAILED DESCRIPTION below.

DETAILED DESCRIPTION

The vehicle may further comprise an electric component disposed inside the front compartment and below the drainage outlet. The drainage channel may further comprise an outlet configured to discharge the drainage water. The outlet may be disposed out of an area of the electric component in a plan view of the vehicle. The water can be drained to an area where the electric component is not present. Thus, it is possible to prevent a failure of the component vulnerable to water.

The vehicle may further comprise a cowl panel disposed at a rear portion of the front compartment with respect to a front-rear direction of the vehicle, and the cowl panel may be configured to drain water. The drainage channel may be a tubular member constituted of a rigid material. An inlet of the tubular member may comprise an opening that is open upward. An outlet of the tubular member may be disposed within an area of the cowl panel in a plan view of the vehicle and above the cowl panel. Water in the recess can be discharged to the outside of the vehicle using the cowl panel configured to drain water.

The tubular member may be fixed to a lower surface of the hood panel. The drainage outlet and the inlet may be maintained to face each other regardless of whether the hood panel is open or closed. The tubular member can be integrated with the hood panel.

The tubular member may be fixed inside the front compartment. The drainage outlet and the inlet may face each other in an up-down direction of the vehicle when the hood panel is closed. The drainage outlet and the inlet may not face each other when the hood panel is open. The tubular member can be disposed inside the front compartment.

The outlet of the tubular member may be disposed rearward of the inlet of the tubular member. Water can be discharged from within the tubular member by acceleration of gravity generated in the front-rear direction of the vehicle due to acceleration and deceleration of the vehicle.

A height of the outlet from a ground may be lower than a height of the inlet from the ground. Water can be discharged from within the tubular member by gravity.

The drainage channel may be a flexible hose. An inlet of the hose may be connected to the drainage outlet. An outlet of the hose may be disposed outside of a frame that defines the front compartment. The hose may be fixed to a lower surface of the hood panel. The drainage outlet and the inlet may be maintained to be connected each other regardless of whether the hood panel is open or closed. Water can be discharged from the recess in the upper surface of the hood panel through the hose. The flexibility of the hose provides an increased degree of design freedom.

A height of the outlet from a ground may be lower than a height of the inlet from the ground. Water can be discharged from within the hose by gravity.

First Embodiment

Figure 1:
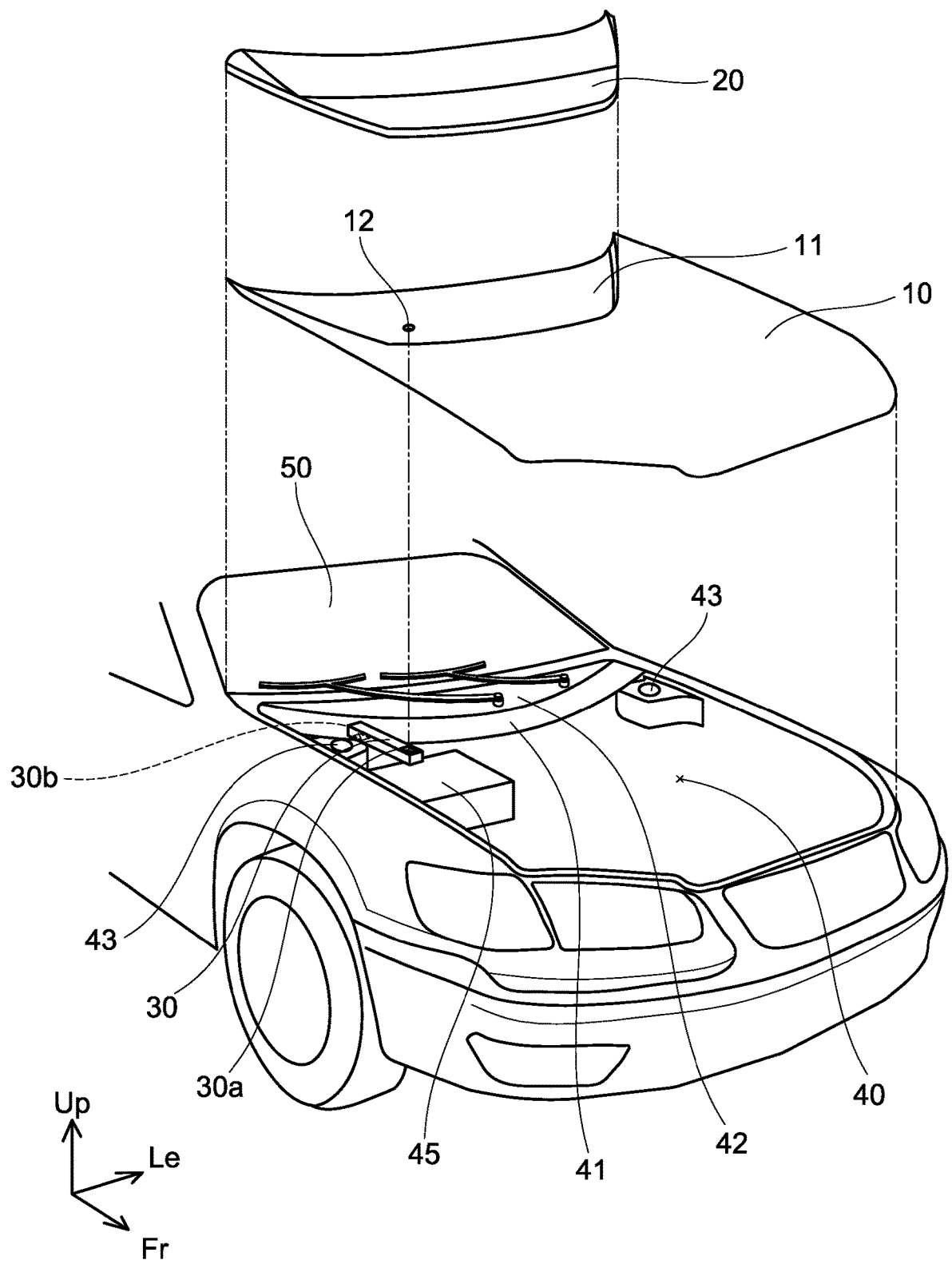
FIG. 1 is an exploded perspective view of a front portion of a vehicle.
Figure 2:
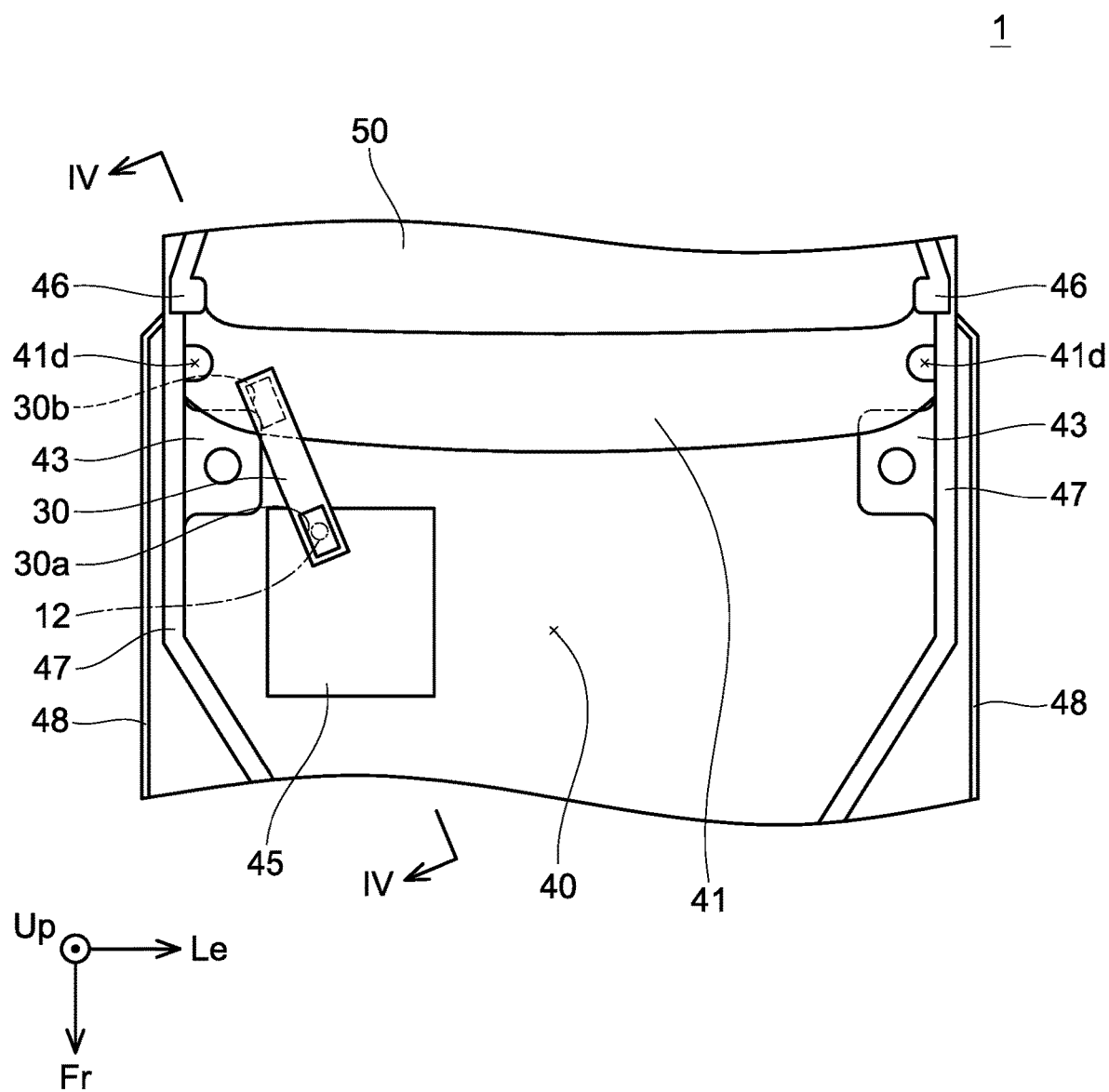
FIG. 2 is a plan view of the front portion of the vehicle (first embodiment)

FIG. 1 shows an exploded perspective view of a front portion of a vehicle 1 according to a first embodiment. FIG. 2 shows a plan view of the front portion of the vehicle 1. In FIG. 2, a hood panel 10 and a cowl louver 42 are not shown. Regarding the coordinate system in FIGS. 1 and 2, "Fr" indicates a front direction of the vehicle, "Up" indicates an upward direction of the vehicle, and "Le" indicates "left" in a rear view of the vehicle. The same applies to the coordinate system in the other drawings.

As shown in FIG. 1, the vehicle 1 includes a hood panel 10, a hood garnish 20, and a front compartment 40. The hood panel 10 includes a recess 11 in its upper rear portion. The recess 11 reaches a rear edge of the hood panel 10. A drainage outlet 12 is disposed in a bottom surface of the recess 11. The drainage outlet 12 is a hole penetrating the hood panel 10.

The hood garnish 20 is mounted at the recess 11. The hood garnish 20 is constituted of a rigid resin material. The hood garnish 20 is configured to direct wind upward and guide it to above a front windshield 50 while the vehicle 1 is traveling. The hood garnish 20 is also called a deflector. The hood garnish 20 can be fixed at the recess 11 by engaging a clip (not shown) disposed on a back surface of the hood garnish 20 with a clip hole (not shown) formed in the recess 11.

The front compartment 40 is a space forward of a dash panel. The front compartment 40 houses a power controller 45. The power controller 45 is a device configured to control electric power supplied to a motor (not shown). Specifically, the power controller 45 converts DC power of a high-voltage battery (not shown) into AC power for driving the motor. Further, AC regenerative power generated by the motor is converted into DC power by the power controller 45 and supplied to the high-voltage battery. Since the power controller 45 handles high voltage, it is vulnerable to water compared with other components such as an engine. The front compartment 40 also houses other various components such as the engine, the motor, the battery, and the like, however, description for these components is omitted in the disclosure herein.

A metal cowl panel 41 is disposed rearward of the front compartment 40. The cowl panel 41 covers a clearance between the rear edge of the hood panel 10 and a front edge of the front windshield 50. The cowl panel 41 also has a gutter function of receiving and draining water sliding down from the front windshield 50. An upper portion of the cowl panel 41 is covered by a resin cowl louver 42. The cowl louver 42 is also called a cowl top panel.

As shown in FIG. 2, the cowl panel 41 extends in a width direction of the vehicle. Each of both ends of the cowl panel 41 is connected to corresponding suspension tower 43 and front pillar 46. A cross section of the cowl panel 41 along a vertical direction to the width direction has an upwardly open curved shape. That is, it is curved to protrude downward. Drainage outlets 41d are respectively disposed in the ends of the cowl panel 41 in the width direction. Water received by the cowl panel 41 is discharged to the outside of the vehicle from the drainage outlets 41d.

Apron upper members 47 extend in a front-rear direction of the vehicle at both ends of the front compartment 40 in the width direction, respectively. The apron upper members 47 reinforce a fender apron (not shown) and configure a body frame. The apron upper members 47 also define the front compartment 40 in the width direction. A front fender panel 48 is disposed outward of each apron upper member 47.

Figure 3:
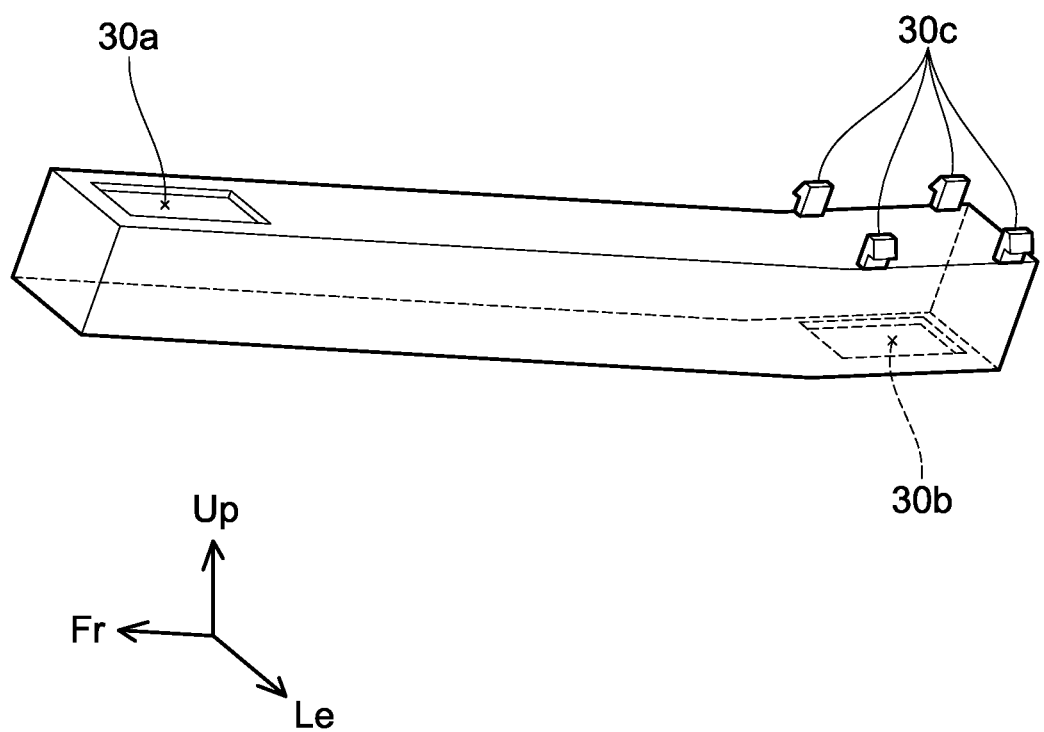
FIG. 3 is a perspective view of a tubular member according to the first embodiment.

A tubular member 30 is disposed inside the front compartment 40. FIG. 3 shows a perspective view of the tubular member 30. The tubular member 30 is constituted of a rigid material such as resin. The tubular member 30 includes an inlet 30a, an outlet 30b, and fixation stops 30c. The inlet 30a includes an opening that is open upward. The outlet 30b includes an opening that is open downward. The fixation stops 30c are configured to engage with holes (not shown) provided in a lower surface of the cowl louver 42. The fixation stops 30c can fix the tubular member 30 to the cowl louver 42. That is, the tubular member 30 can be fixed inside the front compartment 40.

As shown in FIGS. 1 and 2, the tubular member 30 is disposed inside the front compartment 40 and below the hood panel 10. The inlet 30a is positioned vertically below the drainage outlet 12 of the hood panel 10. In FIG. 2, the position of the drainage outlet 12 is shown by a broken line. The power controller 45 is disposed below the drainage outlet 12.

The outlet 30b is disposed above the cowl panel 41 within the area of the cowl panel 41. In other words, the outlet 30b is disposed in an area where no electric component such as the power controller 45 is present underneath. That is, the outlet 30b is disposed out of the area of the power controller 45 in a plan view of the vehicle 1.

Figure 4:
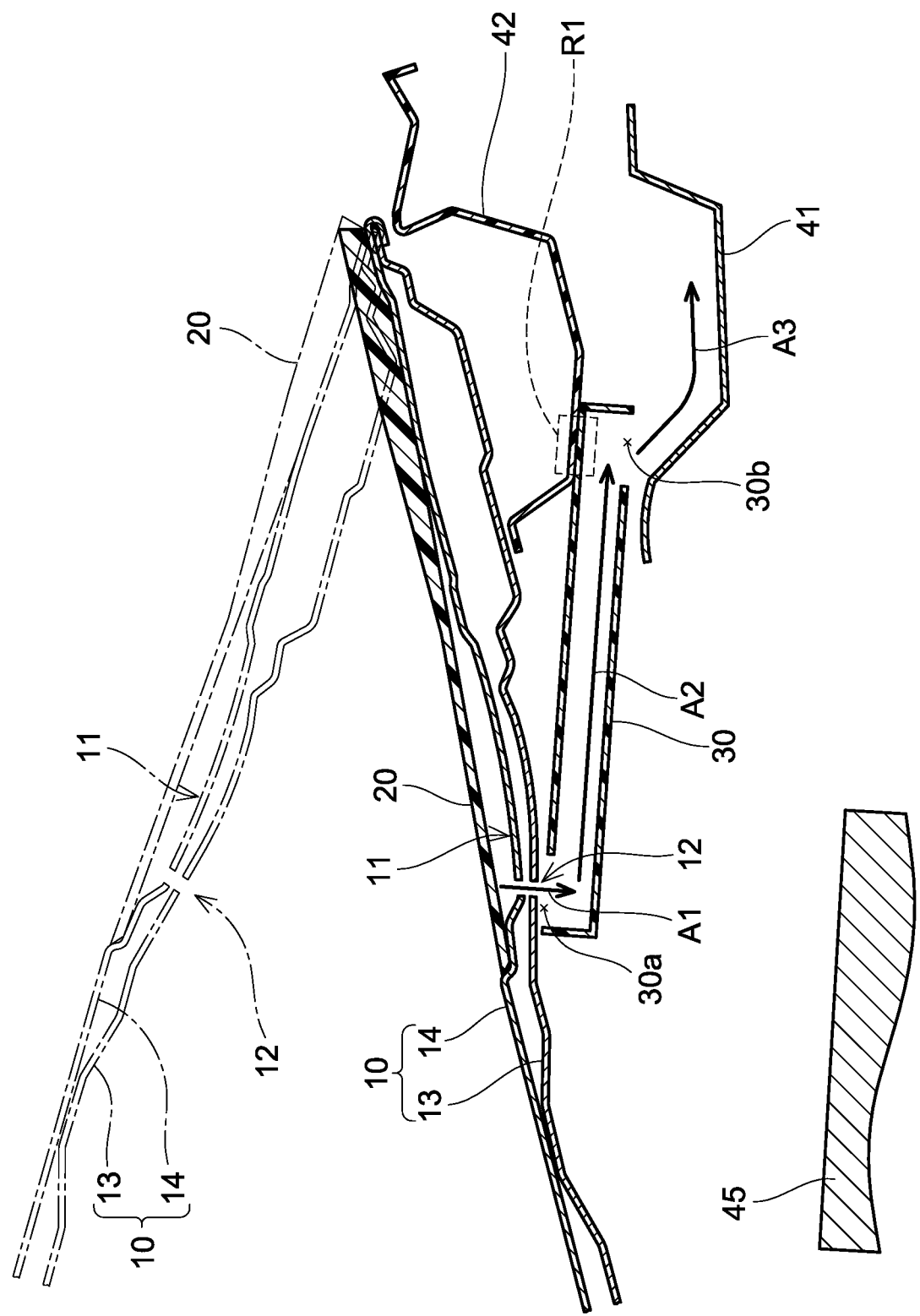
FIG. 4 is a cross-sectional view of the tubular member according to the first embodiment and its surroundings.

FIG. 4 shows a cross sectional view along a line IV-IV in 2. The line IV-IV passes the central axis of the tubular member 30. In FIG. 4, only the tubular member 30 and its surroundings are shown in an enlarged manner. The hood panel 10 shown by a solid line indicates a closed state of the hood panel 10. The hood panel 10 shown by a dash-and-dot line indicates an open state of the hood panel 10.

The hood panel 10 includes an inner hood panel 13 and an outer hood panel 14. The inner hood panel 13 covers the front compartment 40. The outer hood panel 14 covers the inner hood panel 13 from above and its upper surface can be seen from the outside. The drainage outlet 12 is formed at the lowest position of the bottom surface of the recess 11. The drainage outlet 12 penetrates the outer hood panel 14 and the inner hood panel 13. Thus, as indicated by an arrow A1, water having entered the recess 11 can be discharged downward through the drainage outlet 12.

As shown in a region R1, an upper rear portion of the tubular member 30 is fixed to the lower surface of the cowl louver 42 with the fixation stops 30c (see FIG. 3). The outlet 30b is disposed above the cowl panel 41.

When the hood panel 10 is open (dash-and-dot line), the drainage outlet 12 does not face the inlet 30a. To the contrary, when the hood panel 10 is closed (solid line), the drainage outlet 12 faces the inlet 30a in an up-down direction. That is, closing the hood panel 10 automatically forms a channel from the drainage outlet 12 to the inlet 30a. As a result, as indicated by the arrow A1, water discharged through the drainage outlet 12 can be received by the inlet 30a.

A height of the outlet 30b from the ground is lower than a height of the inlet 30a from the ground. Therefore, as indicated by an arrow A2, the water received through the inlet 30a can flow to the outlet 30b by gravity. Further, the outlet 30b is positioned rearward of the inlet 30a in the vehicle 1. Therefore, the water can flow through the inside of the tubular member 30 toward the outlet 30b by acceleration of gravity generated in the front-rear direction due to acceleration and deceleration of the vehicle 1.

As indicated by an arrow A3, the water discharged from the outlet 30b is received by the cowl panel 41. Then, the water is discharged from the drainage outlets 41d (see FIG. 2) of the cowl panel 41 to the outside of the vehicle. Thus, water accumulation in the recess 11 in the upper surface of the hood panel 10 can be reduced. It is possible to prevent problems such as formation of rust.

Without the tubular member 30, the water discharged from the drainage outlet 12 would. reach the power controller 45 disposed below the drainage outlet 12. The power controller 45 might fail due to getting wet. The technique disclosed herein enables the tubular member 30 to guide the water discharged from the drainage outlet 12 to the cowl panel 41 under which an electric component is not disposed. It is possible to prevent a failure of electric component vulnerable to water.

Second Embodiment

In the first embodiment, an aspect in which the tubular member 30 is fixed inside the front compartment 40 has been described in a second embodiment, an aspect in which the tubular member 30 is fixed to a lower surface of the hood panel 10 will be described. The same elements and components as those of the first embodiment will be given the same reference signs and descriptions for them will be omitted.

Figure 5:
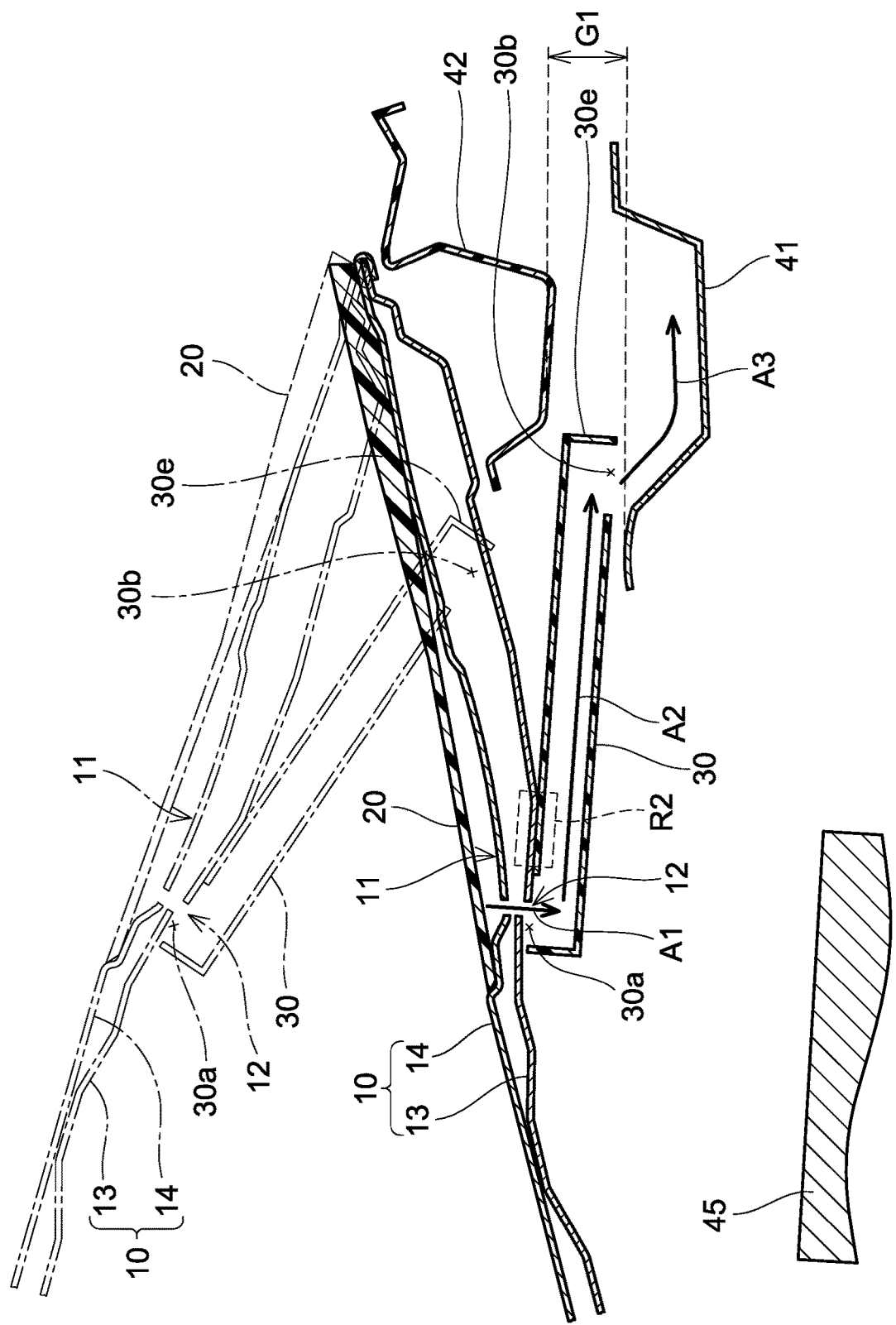
FIG. 5 is a cross-sectional view of a tubular member according to a second embodiment and its surroundings.

FIG. 5 shows an enlarged view of a tubular member 30 according to the second embodiment and its surroundings. The cross section of FIG. 5 is taken along the same line as the cross section of FIG. 4. As shown in a region R2, an upper front portion of the tubular member 30 is fixed to a lower surface of the inner hood panel 13. This maintains the drainage outlet 12 and the inlet 30a to face each other regardless of whether the hood panel 10 is open or closed. This fixation can be implemented by the fixation stops 30c (see FIG. 3), as in the first embodiment.

A rear end 30e of the tubular member 30 is a free end. When the hood panel 10 is open (dash-and-dot line), the rear end 30e is out of the area of the cowl panel 41 in the plan view of the vehicle 1. By the hood panel 10 being closed, the rear end 30e is inserted, from the front side, into a space G1 defined by the lower surface of the cowl louver 42 and the upper surface of the cowl panel 41. When the hood panel 10 is closed (solid line), the rear end 30e is positioned within the area of the cowl panel 41 in the plan view of the vehicle 1 and positioned below the cowl louver 42 and above the cowl panel 41.

That is, closing the hood panel 10 automatically sets the outlet 30b in the area of the cowl panel 41. Thus, as in the first embodiment, water can be discharged to the cowl panel 41 from the recess 11 in the upper surface of the hood panel 10 (see the arrows A1 to A3).

Third Embodiment

In the first and second embodiments, aspects in which the drainage is implemented using the tubular member 30 have been described. In a third embodiment, an aspect in which the drainage is implemented using a hose will be described. The same elements and components as those of the first embodiment will be given the same reference signs and descriptions for them will be omitted.

Figure 6:
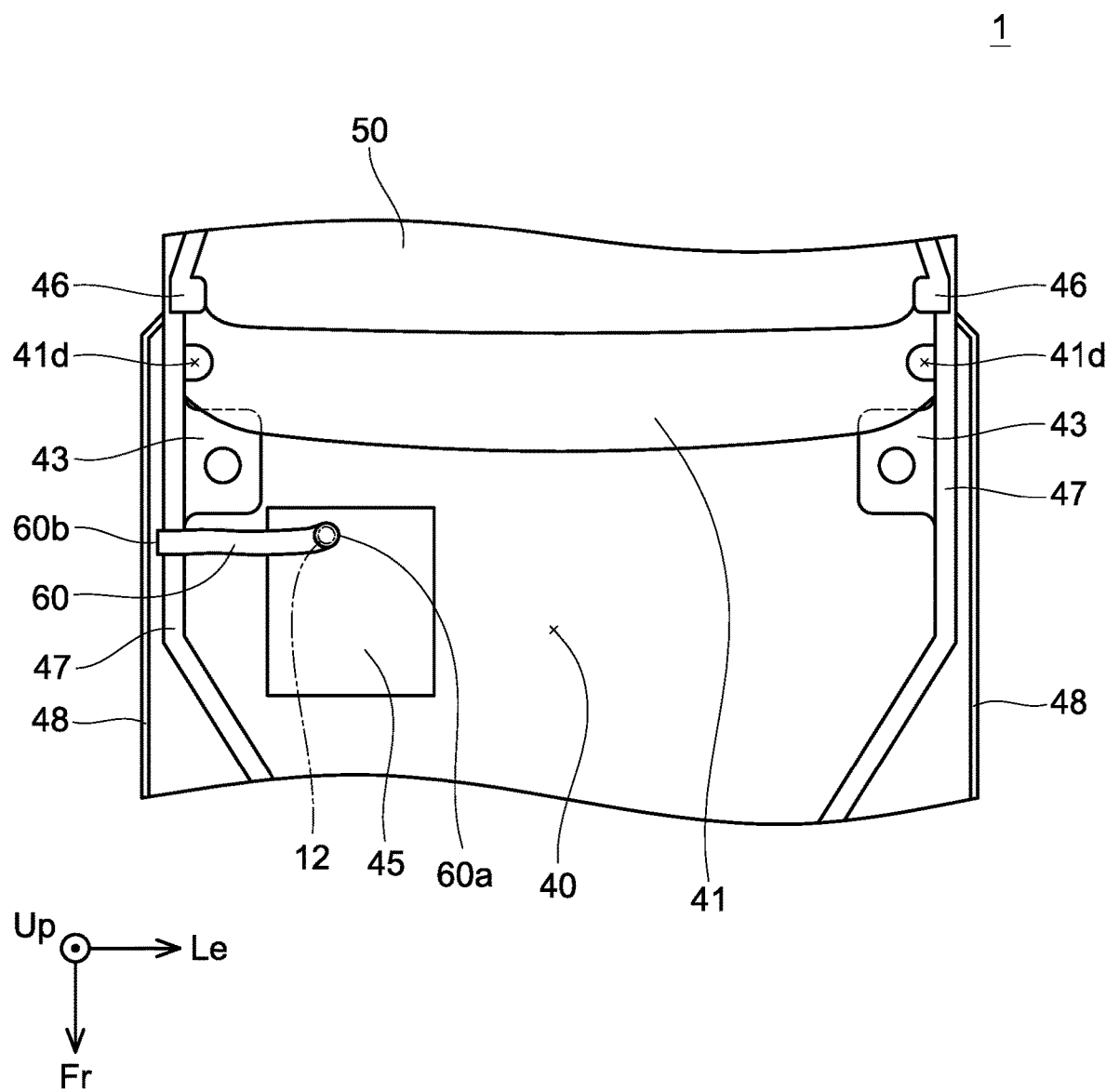
FIG. 6 is a plan view of a front portion of a vehicle (third embodiment).

FIG. 6 shows a plan view of the front portion of the vehicle 1. The plan view of FIG. 6 is the same as that of FIG. 2. In FIG. 6, the hood panel 10 is not shown and the position of the drainage outlet 12 is shown by a broken line. As shown in FIG. 6, a hose 60 is disposed inside the front compartment 40 and below the hood panel 10.

The hose 60 is constituted of an elastic material such as rubber and is flexible. The hose 60 includes an inlet 60a and an outlet 60b. The hose 60 is fixed to the lower surface of the inner hood panel 13 with a fastener (not shown). The inlet 60a is connected to the drainage outlet 12. This maintains the drainage outlet 12 and the inlet 60a to be connected to each other regardless of whether the hood panel 10 is open or closed.

The outlet 60b is an open end of the hose to the open air. The outlet 60b is, in the plan view, disposed outward of one of the apron upper members 47 and inward of the corresponding front fender panel 48. Further, a member that withstands water exposure (e.g., a non-metal member such as a fender liner) is disposed below an area where the outlet 60b is disposed. In other words, the outlet 60b is disposed in an area where no electric component such as the power controller 45 is present underneath. That is, the outlet 60b is disposed out of an area of electric component such as the power controller 45 in the plan view of the vehicle 1.

Further, a height of the outlet 60b from the ground is lower than a height of the inlet 60a from the ground.

Thus, as in the first and second embodiments, water can be discharged from the recess 11 in the upper surface of the hood panel 10 to the area outward of the apron upper member 47. Further, the flexibility of the hose 60 provides an increased degree of design freedom for layout of the hose 60 and position of the outlet 60b.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

(Variants)

The arrangement and number of the drainage outlet 12 and the tubular member 30 are not limited to those described in the embodiments, and may be freely changed.

The tubular member 30 is not limited to having the shape described in the embodiments, and may have any shape. For example, the tubular member 30 may have a shape of gutter in which an upper surface of the tubular member 30 is open across the entire length thereof.

The way of fixing the tubular member 30 is not limited to the fixation stops 30c. Various other ways may be used.

The power controller 45 is an example of the electric component. The apron upper members 47 are an example of the frame.

What is claimed is:

1. A vehicle comprising:
a body comprising a front compartment;
a hood panel covering the front compartment and comprising a recess in an upper surface of the hood panel;
a hood garnish mounted at the recess;
a drainage outlet disposed at a bottom of the recess and penetrating the hood panel;
a drainage channel disposed below the hood panel and comprising an inlet configured to receive drainage water from the recess; and
a cowl panel disposed at a rear portion of the front compartment with respect to a front-rear direction of the vehicle, the cowl panel being configured to drain water, wherein:
the drainage channel is a tubular member constituted of a rigid material,
an inlet of the tubular member comprises an opening that is open upward, and
an outlet of the tubular member is disposed above the cowl panel.

2. The vehicle according to claim 1, wherein
the tubular member is fixed to a lower surface of the hood panel, and
the drainage outlet and the inlet are maintained to face each other regardless of whether the hood panel is open or closed.

3. The vehicle according to claim 1, wherein
the tubular member is fixed inside the front compartment, the drainage outlet and the inlet face each other in an up-down direction of the vehicle when the hood panel is closed, and the drainage outlet and the inlet do not face each other when the hood panel is open.

4. The vehicle according to claim 1, wherein the outlet of the tubular member is disposed rearward of the inlet of the tubular member.

5. The vehicle according to claim 1, wherein a height of the outlet from a ground is lower than a height of the inlet from the ground.

\* \* \* \* \*